United States Patent Office 2,745,863
Patented May 15, 1956

2,745,863
PREPARATION OF ALKARYL PHOSPHORIC ACIDS

Ferdinand P. Otto, Woodbury, N. J., assignor to Socony Mobil Oil Company, Inc., a corporation of New York No Drawing. Application December 17, 1952,
Serial No. 326,590

7 Claims. (Cl. 260—461)

This invention relates to a novel and economical method for preparing alkaryl phosphoric acids.

Heretofore, alkaryl phosphoric acids have been prepared by a method involving, first, the preparation of an alkyl aromatic hydroxy compound by the reaction of an olefin with an aryl hydroxide in the presence of an alkylation catalyst, such as $H_2SO_4$, $BF_3$, $HF$, $AlCl_3$, $ZnCl_2$, etc., and, after removal of the catalyst and purification of the product, then reacting the alkyl hydroxyaromatic compound with $P_2O_5$ to form the desired alkaryl phosphoric acids.

I have now found that alkaryl phosphoric acids may be prepared directly in a simple and economical "one-step" method. In this new method, the alkylation of the olefin with the hydroxy-aromatic compound and the reaction of the resulting alkylated hydroxyaromatic compound with $P_2O_5$ to form the desired phosphoric acids are carried out simultaneously and without the use of an added alkylation catalyst of the type mentioned hereinabove. This new method, therefore, provides a two-fold advantage over the prior art method of preparing the alkaryl phosphoric acids in that (1) it saves the cost of utilizing a catalyst and (2) it avoids the necessity for having to remove the catalyst from the reaction product.

It is, therefore, the object of this invention to provide a new and improved method for the preparation of alkaryl phosphoric acids utilizing an olefin, a hydroxyaromatic compound and $P_2O_5$ as starting materials. Other and further objects will become apparent from the following description of the invention.

Broadly, the method of the invention involves the reaction of the olefin, the hydroxyaromatic compound and the $P_2O_5$ together, at a temperature of from about 50° C. to about 125° C. and preferably from about 90 to about 110° C., for a time period sufficient to form the desired alkyl hydroxyaromatic phosphoric acid product, i. e., from several hours to about 20 hours. When the reaction is complete, the product is topped at a somewhat higher temperature, say, about 150° C. or higher, under diminished pressure, to remove any excess olefin and traces of unreacted hydroxyaromatic compound.

In bringing the reactants together, it is advantageous to first prepare a homogeneous mixture of the olefin and the hydroxyaromatic compound by mixing the two and heating the mixture to a moderately elevated temperature, i. e., around 40–50° C. It is preferable to then add the $P_2O_5$ to this mixture portionwise over a period of several hours. In this way the exothermic heat of reaction may be controlled and the temperature of the reaction maintained at the aforesaid preferred level of from about 90 to about 110° C.

The alkaryl phosphoric acids obtained by the method of this invention are the same alkaryl phosphoric acids obtained by the separate steps of (1) alkylating the hydroxyaromatic compound with the olefin in the presence of an added alkylation catalyst, (2) removing the catalyst from the alkylated product and (3) reacting the alkylated hydroxyaromatic compound with the $P_2O_5$. The similarity of the products obtained in the old and new methods is evident from analytical data as will be seen in the various examples which follow. Theoretically, it is known that when an alkyl hydroxyaromatic compound, such as an alkyl phenol, which has been formed in the presence of a conventional alkylation catalyst, such as aluminum chloride, is reacted with $P_2O_5$ in a mol ratio of 3 to 1, the product obtained consists essentially of a mixture of monoalkaryl phosphoric acids (1), di-alkaryl phosphoric acids (2), and di-alkaryl pyrophosphoric acids (3) represented by the following formulae wherein R represents the alkaryl substituent:

(1) 

(2) 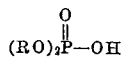

(3) 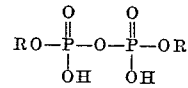

Other mol ratios of the alkyl hydroxyaromatic compound and the $P_2O_5$, such as 2:1 or 1:1 ratios, may be used and the relative proportions of (1), (2) and (3) present in the product would be governed to some extent by the particular ratio of these reactants used. Thus, with the 3:1 alkyl hydroxyaromatic compound: $P_2O_5$ mol ratio, the major components of the product are the mono- and di-esters of phosphoric acid with minor portions of the pyrophosphoric acid ester. However, when a 2:1 mol ratio is employed, the major component would probably be the ester of pyrophosphoric acid.

On the other hand, although the exact mechanism of the reaction involved in the method of this invention is not known, it is believed that the phosphorus pentoxide reacts with the aromatic hydroxy compound and that the phosphoric acid derivative thus formed acts as the initial alkylation catalyst. It has been shown experimentally, for example, that catalytic quantities of the reaction product of phenol and $P_2O_5$ will serve as the catalyst for the formation of octylphenol from diisobutylene and phenol. In any case, and without intending to limit the invention in any way by theory, it is believed that the equations representing the probable over-all mechanism for the reaction of the invention may take place in accordance with the following equations wherein R represents the olefin reactant and R' is the resulting alkyl substituent:

(1) Formation of catalyst with minor amounts of $P_2O_5$:

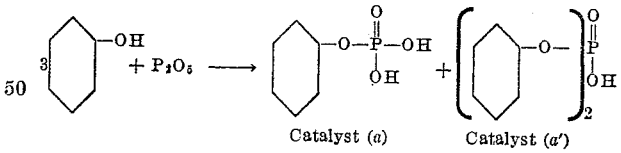

(2) Alkylation of phenol:

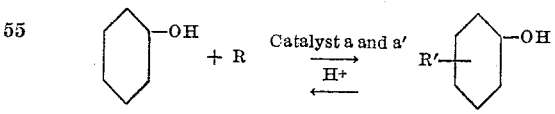

(3) Ester interchange of alkylphenol with catalyst to give free phenol and generate alkylated catalyst:

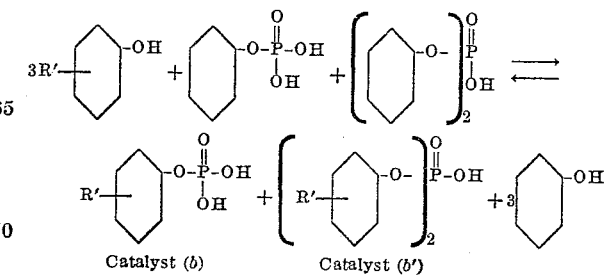

(4) Alkylation of remaining phenol catalyzed either by more catalyst formed as in step (1) as more P₂O₅ is added or by alkylated catalyst formed in step (3). This reaction drives step (3) to the right as more alkyl phenol is formed.

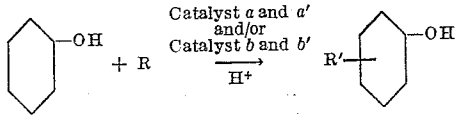

(5) Reaction of alkyl phenol with remainder of P₂O₅ to give final product.

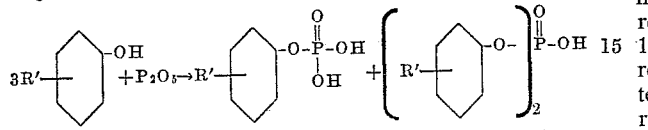

The hydroxyaromatic compounds which have been found operative in the process of the invention are phenol, alpha- and beta-naphthol, ortho-cresol and catechol. On the other hand, meta-cresol, para-cresol, resorcinol and hydroquinone have been found to be unsatisfactory for the process.

Certain types of olefins are not utilizable in the method of the invention. Thus, it has been found that olefins which are suitable are those in which no hydrogen atoms are attached to at least one of the carbon atoms of the olefinic bond. These olefins may be terminal or internal type olefins. Thus, generally olefins of the following types, viz., RR'C=CH₂, RR'C=CHR and RR'C=CR'R, wherein R represents an alkyl, aryl or alkaryl group, are the most satisfactory for the process, while olefins of the types RCH=CH₂ and RCH=CHR' are generally not satisfactory. The suitable olefins may, therefore, be aliphatic olefins having from 4 to about 24, or more, carbon atoms and aryl-substituted aliphatic olefins having from 3 to 24, or more, carbon atoms in the aliphatic portions thereof. Typical suitable olefins are:

(a) Type RRC=CH₂:
  2,4,4-trimethyl-1-pentene
  2-ethyl-1-hexene
  α-methyl styrene
  2,3-dimethyl-1-hexene
  2-methyl-1-pentadecene (b) Type RRC=CHR:
  2-methyl-2-butene
  2-methyl-2-pentene
  3-ethyl-2-pentene
  2,5-dimethyl-2-hexene
  6-butyl-5-undecene
  2-methyl-2-tricosene
  2,4,4-trimethyl-2-pentene (c) Type RRC=CRR:
  2,3-dimethyl-2-butene
  2,3-dimethyl-2-pentene
  3,4-dimethyl-3-hexene
  2,3,4-trimethyl-2-pentene Mixtures of olefins of the aforesaid types are also suitable in the invention. Diisobutylene, for example, which is a 4 to 1 mixture of 2,4,4-trimethyl-1-pentene and 2,4,4-trimethyl-2-pentene, is a preferred olefin reactant.

The proportions of olefin, hydroxyaromatic compound and P₂O₅ utilized in the process of the invention are essentially those utilized in the heretofore described prior art method of preparing the alkaryl phosphoric acids. Thus, 1 to 3 mols of the hydroxyaromatic compounds per mol of P₂O₅ may be employed, a ratio of 3 mols of the hydroxyaromatic compound to 1 mol of P₂O₅ being preferred. The proportion of olefin reactant is based on the amount of the hydroxyaromatic compound used in the reaction, a mol ratio of at least about 1 mol of olefin to 1 mol of the hydroxyaromatic compound reactant being required and a slight excess of the olefin generally being used. However, greater proportions of olefin may be utilized, if desired, in order to provide products having more than one olefin molecule alkylated to the aryl ring of the hydroxyaromatic compound. For example, 2 or 3 mols of olefin may be used where a di- or tri-alkylated aryl ring product is desired.

In practice the method of the invention is conveniently carried out by mixing the hydroxyaromatic compound and olefin reactants together and heating sufficiently to obtain a homogeneous mixture, i. e., about 40–50° C. The temperature is then brought up to about 100° C. and the P₂O₅ reactant is added in portions of, say, 5–10 per cent of the total amount of intervals of, say, about ½ hour. After the addition of the P₂O₅ is complete, the reaction is continued for from, say, 5 to 10 hours at the 100° C. temperature level to insure completion of the reaction. The reaction mixture is then topped at higher temperature, say, about 150° C. or higher, in order to remove unreacted olefin and hydroxyaromatic compound from the product.

The following specific examples will serve to illustrate more fully the method of the invention.

EXAMPLE I

*Octylphenyl phosphoric acids*

MATERIALS 565 grams phenol (6 mols)
805 grams diisobutylene, a 4:1 mixture of 2,4,4-trimethyl-1-pentene and 2,4,4-trimethyl-2-pentene (7.2 mols)
284 grams phosphoric anyhdride (P₂O₅) (2 mols)

PROCEDURE

The phenol and diisobutylene were placed in a 3-liter round-bottom flask equipped with a mechanical stirring device, a thermometer and a condenser. A homogeneous mixture of these two reactants was obtained by stirring the mixture and heating to 45° C. The P₂O₅ was added in portions of about 22 grams each at half-hourly intervals over a period of 6 hours. The temperature was maintained between 93° C. and 105° C. after the first addition by the ensuing exothermic reaction during the early stages of the P₂O₅ addition. The reaction mixture was then heated and stirred for an additional 7.5 hours at 100° C. The weight of the crude reaction mixture was 1650.1 grams, which is essentially the sum of the weights of the reactants. A 300-gram portion of the crude material was subjected to distillation at 75 mm. mercury pressure to a maximum liquid temperature of 150° C. to remove unreacted diisobutylene and small amounts of phenol, leaving 261 grams of a clear amber viscous liquid. The analysis of the product compared favorably with that expected from the reaction of 3 mols of octylphenol with 1 mol of P₂O₅. On this basis, the yield of product represented a 95.2 per cent conversion.

ANALYSIS OF PRODUCT

|  | Found | Calculated for Octylphenol-P₂O₅ (3:1) Product |
| --- | --- | --- |
| Percent Phosphorus | 7.91 | 8.18 |
| Potentiometric N. N. at 1st H+ | 162 | 148 |
| Potentiometric N. N. (Total) | 215 | 222 |

EXAMPLE II

*Pilot plant preparation of octylphenyl phosphoric acids*

MATERIALS 8.52 lbs. phenol (0.090 pound mol)
12.19 lbs. diisobutylene (0.109 pound mol)
4.30 lbs. phosphoric anyhdride (P₂O₅) (0.03 pound mol)

EQUIPMENT

The reaction was carried out in a glass-lined, 5-gallon Pfaudler kettle equipped with an anchor-type stirrer. The crude product was topped in a 22-liter round-bottom flask in a slow stream of nitrogen using a stillhead packed with glass wool and a large conventional condensing system. The product was filtered through a porcelain Buchner suction funnel packed with 0.25 inch of "Hyflo" clay (a diatomaceous earth filter-aid).

PROCEDURE

The phenol and diisobutylene were mixed and the $P_2O_5$ added in thirteen individual portions of approximately 0.33 pound each at half-hour intervals over a period of 6 hours. The first addition was made at 125° C. causing an exothermic reaction to take place which increased the temperature to 175° F. without external heating. The second and third additions were made at 175° F., the external heat source being applied after the milder exothermic reaction of the second $P_2O_5$ addition had subsided. The remaining additions were made at about 210° F. Following the last addition, the reaction mixture was held at 210–215° F. for 8 hours.

The crude product, a clear amber oil, was siphoned into a 22-liter flask and topped to 310° F. under diminished pressure. The vacuum was applied gradually until reaching a pressure of 8 mm. mercury pressure. The yield of clear topped product was 20.73 pounds or 90.2 per cent of the theoretical yield for an equimolar mixture of dioctylphenyl phosphoric acid and mono-octylphenyl phosphoric acid. After filtering the topped residue through "Hyflo" filter-aid contained on a heated Buchner funnel, 19.79 pounds of product was recovered which reduced the yield to 86.1 per cent.

ANALYSIS OF PRODUCT

| | Found | Calculated for equimolar mixture of $(C_8H_{17}C_6H_4O)_2\overset{O}{\underset{\|}{P}}\text{-OH}$ and $C_8H_{17}C_6H_4O\text{-}\underset{\underset{O}{\|}}{P}(OH)_2$ |
|---|---|---|
| Percent Phosphorus | 8.75 | 8.18 |
| Potentiometric N. N. at 1st H+ | 156 | 148 |
| Potentiometric N. N. (Total) | 220 | 222 |

EXAMPLE III

Butylphenyl phosphoric acids

MATERIALS 141 grams phenol (1.50 mols)
83.5 grams isobutylene (1.49 mols)
71.5 grams phosphoric anhydride (0.503 mol)

PROCEDURE

The phenol was placed in a 1-liter round-bottom flask equipped with stirrer, thermometer, condenser and gas inlet tube and was heated, with stirring, to 80° C. Isobutylene passed in below the surface of the molten phenol through the gas inlet tube. The flow of isobutylene was continuous during the entire period of $P_2O_5$ addition. The $P_2O_5$ was added in thirteen individual portions of 5.5 grams each at half-hour intervals over a period of 6 hours. The temperature was maintained generally between 80° C. and 100° C. during the $P_2O_5$ addition and then was held at 100° C. during an additional 8 hours of heating and stirring.

The crude reaction product was subjected to distillation at 2.5 mm. mercury pressure to a maximum liquid temperature of 120° C. leaving a residue of 273.5 grams. The analysis of the residue compared favorably with that expected from an equimolar mixture of mono- and di-butylphenyl phosphoric acids. On this basis, the weight of residue represents a yield of 92.4 per cent of such a product.

ANALYSIS OF PRODUCT

| | Found | Calculated for equimolar mixture of mono- and dibutylphenyl phosphoric acids |
|---|---|---|
| Percent Phosphorus | 10.95 | 10.5 |
| Potentiometric N. N. at 1st H+ | 206 | 189 |
| Potentiometric N. N. (Total) | 274 | 284 |

EXAMPLE IV

Octyl-ortho-cresyl phosphoric acids

MATERIALS 162 grams ortho-cresol (1.5 mols)
202 grams diisobutylene (1.8 mols)
71.5 grams phosphoric anhydride (0.503 mol)

PROCEDURE

The ortho-cresol and the diisobutylene were placed in a 1-liter round-bottom flask equipped with a stirrer, condenser and thermometer. The solution was heated to 50° C. and the $P_2O_5$ added in thirteen individual portions of 5.5 grams each at half-hour intervals over a period of 6 hours. After the first addition, the mixture was held at 100° C., at first by the exothermic reaction taking place, but after the third addition by external heating. Following the last addition, the reaction mixture was heated and stirred for eight more hours at approximately 100° C. The crude product was subjected to distillation at 2 mm. mercury pressure to a maximum liquid temperature of 150° C. leaving a residue of 340 grams. Assuming that all of the cresol and $P_2O_5$ are still present in combined form, the weight of residue in excess of the sum of the original weights of cresol and $P_2O_5$ indicates an alkylation of 63.4 per cent of the cresol. This assumption is substantiated by the analysis of the product.

ANALYSIS OF PRODUCT

| | Found | Calculated for 63.4% alkylation of cresol |
|---|---|---|
| Percent Phosphorus | 9.15 | 9.15 |
| Potentiometric N. N. at 1st H+ | 181 | 165 |
| Potentiometric N. N. (Total) | 264 | 247 |

EXAMPLE V

Diphosphoric acids of octylcatechol

MATERIALS 165 grams catechol (1.5 mols)
202 grams diisobutylene (1.8 mols)
143 grams phosphoric anhydride (1.006 mols)

PROCEDURE

The catechol and the diisobutylene were placed in a 1-liter round-bottom flask fitted with stirrer, thermometer and condenser and heated, with stirring, to 100° C. to effect solution. The $P_2O_5$ was added over a 6.25-hour period in twenty separate portions. The first four additions weighed 11 grams each and were added at half-hour intervals; the remaining additions weighed 5.5 grams each and were added at quarter-hour intervals. The temperature during all of the additions was essentially 100° C. and the reaction mixture was heated and stirred at 100° C. for an additional 8 hours. The crude reaction product was subjected to distillation at 2.5 mm. mercury pressure to a maximum liquid temperature of 140° C. leaving a residue of 442 grams. Assuming that all of the catechol and $P_2O_5$ are still present in combined form, the weight of residue indicates an alkylation of 79.7 per cent of the catechol.

ANALYSIS OF PRODUCT

|  | Found | Calculated for 79.7% alkylation of catechol [1] |
|---|---|---|
| Percent Phosphorus | 12.14 | 14.1 |
| Potentiometric N. N. at 1st H+ | 237 | 254 |
| Potentiometric N. N. (Total) | 359 | 381 |

[1] Based on alkylation of each mol of catechol with .797 mols of diisobutylene, esterification of both hydroxyl groups and formation of equimolar amounts of mono- and di-ester.

EXAMPLE VI

*2-Ethylhexylphenyl phosphoric acids*

MATERIALS 141 grams phenol (1.5 mols)
202 grams 2-ethyl-1-hexene (1.8 mols)
71.5 grams phosphoric anhydride ($P_2O_5$) (0.503 mol)

PROCEDURE

The phenol and the 2-ethyl-1-hexene were placed in a 1-liter round-bottom flask fitted with stirrer, thermometer and condenser. The phenol was dissolved in the olefin by heating to 50° C. with stirring. The $P_2O_5$ was added in thirteen individual portions of 5.5 grams each at half-hour intervals over a period of 6 hours. After the first addition, the temperature was maintained generally between 96° C. and 100° C. either by the ensuing exothermic reaction or by the application of external heating.

After the period of the $P_2O_5$ additions, the reaction mixture was heated for an additional 8 hours at 100° C. The crude product was subjected to distillation at 2 mm. mercury pressure to a maximum liquid temperature of 145° C. leaving a residue of 368 grams. Assuming that all the phenol and $P_2O_5$ are still in the product in combined form, the weight of residue indicates an alkylation of 92.5% of the phenol. The residue was then filtered through a bed of "Hyflo" filter-aid, on filter paper using a heated Buchner funnel, and gave 324 grams of a product which compared favorably in analysis with the product expected from the reaction of 3 mols of 2-ethylhexylphenol with 1 mol of $P_2O_5$.

ANALYSIS OF PRODUCT

|  | Found | Calculated for 2-ethylhexyl-phenol-$P_2O_5$ (3:1) Product |
|---|---|---|
| Percent Phorphorus | 8.22 | 8.18 |
| Potentiometric N. N. at 1st H+ | 151 | 148 |
| Potentiometric N. N. (Total) | 250 | 222 |

EXAMPLE VII

*Nonylphenyl phosphoric acids*

MATERIALS 141 grams phenol (1.5 mols)
227 grams nonene (propylene trimer) (1.8 mols)
70.5 grams phosphoric anhydride ($P_2O_5$) (0.496 mol)

PROCEDURE

The phenol and the nonene were placed in a 1-liter 4-necked, round-bottom flask fitted with stirrer, thermometer and condenser. The mixture was heated to 50° C., with stirring, to dissolve the phenol in the olefin. The $P_2O_5$ was then added in thirteen individual portions of about 5.5 g. each at half-hour intervals over a period of 6 hours. After the first addition, the temperature was maintained between 94° C. and 104° C. either by the exothermic reaction which took place or by the application of external heating. The reaction mixture was then further heated and stirred for 8 additional hours. The crude reaction product was subjected to distillation at 3 mm. mercury pressure to a maximum liquid temperature of 165° C. The weight of residue was 310.7 grams. Assuming that all of the phenol was $P_2O_5$ are still present in combined form, the weight of residue in excess of the sum of the original weights of phenol and $P_2O_5$ indicates an alkylation of 53.4 per cent of the phenol.

ANALYSIS OF PRODUCT

|  | Found | Calculated for 53.4% alkylation of phenol |
|---|---|---|
| Percent Phosphorus | 10.07 | 9.95 |
| Potentiometric N. N. at 1st H+ | 186 | 180 |
| Potentiometric N. N. (Total) | 274 | 270 |

EXAMPLE VIII

*Octyl-beta-naphthyl phosphoric acids*

MATERIALS 72.1 grams beta-naphthol (0.5 mol)
179.4 grams diisobutylene (1.6 mols)
23.7 grams phosphoric anhydride ($P_2O_5$) (0.167 mol)
43.5 grams toluene

PROCEDURE

The beta-naphthol, diisobutylene and toluene were placed in a 500-ml. flask and heated to 97° C. to effect solution. The $P_2O_5$ was added in thirteen individual portions of approximately equal weight at half-hour intervals over a period of 6 hours. The temperature was held between 97° C. and 108° C. during the addition of the $P_2O_5$, by the exothermic nature of the reaction during the first three additions and by application of external heating during the last ten. The crude product was subjected to distillation at 2 mm. mercury pressure to a maximum liquid temperature of 145° C. leaving a residue of 132 grams. Assuming that all of the beta-naphthol and $P_2O_5$ are still present in combined form, the weight of residue in excess of the sum of the original weights of beta-naphthol and $P_2O_5$ indicates an alkylation of 64.8 per cent of the naphthol.

ANALYSIS OF PRODUCT

|  | Found | Calculated for 64.8% alkylation of beta-napthol |
|---|---|---|
| Percent Phosphorus | 7.92 | 7.85 |
| Potentiometric N. N. at 1st H+ | 150 | 142 |
| Potentiometric N. N. (Total) | 234 | 212 |

EXAMPLE IX

*Phenylpropylphenyl phosphoric acids*

MATERIALS 94 grams phenol (1 mol)
141.6 grams alpha-methylstyrene (1.2 mols)
47.4 grams phosphoric anhydride ($P_2O_5$) (⅓ mol)

PROCEDURE

The phenol and alpha-methylstyrene were placed in a 1-liter round-bottom flask equipped with a mechanical stirrer, thermometer and condenser. A solution of these two reactants was obtained by stirring the mixture and heating to 50° C. The $P_2O_5$ was added in portions of 3.6 grams each at half-hour intervals over a period of 6 hours. The temperature was maintained between 95° C. and 104° C. after the first addition by the ensuing exothermic reaction during the early stages and by the application of external heat during the later stages of the $P_2O_5$ addition. The reaction mixture was then heated and stirred for an additional 8 hours at 100° C. The weight of the crude reaction mixture was 279.4 grams which is essentially the sum of the weights of the reactants.

The crude reaction product was subjected to distillation at 3 mm. mercury pressure to a maximum liquid temperature of 155° C. leaving a residue of 238.5 grams. Assuming that all of the phenol and $P_2O_5$ are still present in combined form, the weight of residue in excess of the sum of the original weights of phenol and $P_2O_5$ indicates an alkylation of 82 per cent of the phenol.

ANALYSIS OF PRODUCT

|  | Found | Calculated for 82% alkylation of phenol |
|---|---|---|
| Percent Phosphorus | 8.5 | 8.67 |
| Potentiometric N. N. at 1st H+ | 155 | 156 |
| Potentiometric N. N. (Total) | 227 | 234 |

The alkyl aryl phosphoric acids prepared by the method of the invention are useful as components for lubricants, as disclosed in copending application Serial No. 143,156, filed February 8, 1950, now Patent No. 2,638,447, in the name of the present applicant and others. These acids may be converted to complex metal salts which are likewise useful as additives for lubricating oils, as disclosed in copending application Serial No. 246,501 of the present applicant and Serial No. 246,502 of this applicant and Edmund W. Flynn, filed September 13, 1951. Also, these acids may be employed as plasticizers for plastics and coating compositions and as wetting agents.

While the method of the invention has been illustrated herein by means of specific examples utilizing certain reactants and reaction conditions, it is not intended that the scope of the invention be limited in any way thereby, but only as indicated in the accompanying claims.

What is claimed is:

1. A method for preparing an alkaryl phosphoric acid which comprises reacting together (a) 1 mol of $P_2O_5$, (b) from about 1 to about 3 mols of a hydroxyaromatic compound selected from the group consisting of phenol, alpha-naphthol, beta-naphthol, ortho-cresol and catechol and (c) from about 1 mol to about 3 mols per mol of hydroxyaromatic compound used of an olefin, said olefin having from 3 to about 24 carbon atoms in the aliphatic portion thereof and being selected from the group consisting of olefins of the formulae $RRC=CH_2$, $RRC=CHR$ and $RRC=CRR$, wherein R is a radical selected from the group consisting of alkyl, aryl and alkaryl radicals, the mols of olefin supplied to the reaction being at least equal to the mols of hydroxyaromatic compound used, at a temperature of from about 50° C. to about 125° C. and for a period of time sufficient for reaction to take place.

2. A method for preparing an alkaryl phosphoric acid which comprises reacting together (a) 1 mol of $P_2O_5$, (b) from about 1 to about 3 mols of phenol and (c) from about 1 mol to about 3 mols per mol of phenol used of an olefin, said olefin having from 3 to about 24 carbon atoms in the aliphatic portion thereof and having the formula $RRC=CH_2$, wherein R is a radical selected from the group consisting of alkyl, aryl and alkaryl radicals, at a temperature of from about 50° C. to about 125° C. and for a period of time sufficient for reaction to take place.

3. A method for preparing an alkaryl phosphoric acid which comprises reacting together (a) 1 mol of $P_2O_5$, (b) about 3 mols of phenol and (c) about 3 mols of diisobutylene, at a temperature of from about 50° C. to about 125° C. and for a period of time sufficient for reaction to take place.

4. A method for preparing an alkaryl phosphoric acid which comprises reacting together (a) 1 mol of $P_2O_5$, (b) about 3 mols of phenol and (c) about 3 mols of 2-ethyl-1-hexene, at a temperature of from about 50° C. to about 125° C. and for a period of time sufficient for reaction to take place.

5. A method for preparing an alkaryl phenyl phosphoric acid which comprises reacting together (a) 1 mol of $P_2O_5$, (b) about 3 mols of phenol and (c) about 3 mols of alpha-methyl styrene, at a temperature of from about 50° C. to about 125° C. and for a period of time sufficient for reaction to take place.

6. A method for preparing an alkyl aryl phosphoric acid which comprises reacting together (a) 1 mol of $P_2O_5$, (b) about 3 mols of catechol and (c) about 3 mols of diisobutylene, at a temperature of from about 50° C. to about 125° C. and for a period of time sufficient for reaction to take place.

7. A method for preparing an alkyl aryl phosphoric acid which comprises reacting together (a) 1 mol of $P_2O_5$, (b) about 3 mols of beta-naphthol and (c) about 3 mols of diisobutylene, at a temperature of from about 50° C. to about 125° C. and for a period of time sufficient for reaction to take place.

References Cited in the file of this patent

UNITED STATES PATENTS

| 2,214,875 | Cantrell et al. | Sept. 17, 1940 |
| 2,272,668 | Honel | Feb. 10, 1942 |